(12) United States Patent
Ehinger et al.

(10) Patent No.: US 8,500,597 B2
(45) Date of Patent: *Aug. 6, 2013

(54) MULTI-RATIO ROTORCRAFT DRIVE SYSTEM AND A METHOD OF CHANGING GEAR RATIOS THEREOF

(75) Inventors: Ryan T. Ehinger, Irving, TX (US); Carlos A. Fenny, Arlington, TX (US); Charles J. Kilmain, Fort Worth, TX (US); Eric A. Sinusas, Euless, TX (US); Kevin Worrell, Arlington, TX (US)

(73) Assignee: Bell Helicopter Textron Inc., Hurst, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/418,179

(22) Filed: Mar. 12, 2012

(65) Prior Publication Data

US 2012/0208670 A1    Aug. 16, 2012

Related U.S. Application Data

(63) Continuation of application No. 12/502,596, filed on Jul. 14, 2009, now Pat. No. 8,133,155.

(51) Int. Cl.
    *B60K 5/08*    (2006.01)
(52) U.S. Cl.
    USPC .......................................................... 477/2
(58) Field of Classification Search
    USPC ................. 244/17.23; 416/129; 477/2, 6, 124
    See application file for complete search history.

(56) References Cited

U.S. PATENT DOCUMENTS

| | | | | |
|---|---|---|---|---|
| 1,942,197 A * | 1/1934 | Blackstock | | 192/44 |
| 2,971,402 A * | 2/1961 | Lovercheck | | 74/661 |
| 4,200,007 A * | 4/1980 | Espenschied et al. | | 477/110 |
| 4,481,841 A * | 11/1984 | Abthoff et al. | | 74/661 |
| 4,659,286 A | 4/1987 | Garavaglia | | |
| 4,783,023 A | 11/1988 | Jupe | | |
| 4,829,850 A * | 5/1989 | Soloy | | 74/665 B |
| 4,840,088 A * | 6/1989 | Pabst | | 74/661 |
| 4,955,561 A * | 9/1990 | Seefluth | | 244/60 |
| 5,830,104 A * | 11/1998 | Desautels et al. | | 477/109 |
| 5,997,435 A * | 12/1999 | Back | | 477/120 |
| 6,095,947 A * | 8/2000 | Genise | | 477/124 |
| 6,105,449 A * | 8/2000 | Genise et al. | | 74/335 |
| 6,244,965 B1 | 6/2001 | Klecker | | |
| 7,296,767 B2 | 11/2007 | Palcic | | |
| 7,628,355 B2 * | 12/2009 | Palcic et al. | | 244/17.11 |
| 8,133,155 B2 * | 3/2012 | Ehinger et al. | | 477/124 |
| 2007/0205321 A1 | 9/2007 | Walde | | |
| 2008/0173752 A1 | 7/2008 | Palcic et al. | | |

OTHER PUBLICATIONS

WO, PCT/US2010/042023 Search Report, Sep. 9, 2010.

* cited by examiner

*Primary Examiner* — Dirk Wright
(74) *Attorney, Agent, or Firm* — Orrick, Herrington & Sutcliffe LLP

(57) ABSTRACT

A multi-ratio rotorcraft drive system and a method of changing gear ratios thereof are disclosed. According to one embodiment, the multi-ratio rotorcraft drive system comprises a rotor system comprising one or more rotors and one or more engines. Each engine of the one or more engines is coupled to the rotor system through a multi-ratio transmission. The multi-ratio transmission comprises an output shaft coupled to the rotor system, an input shaft coupled to a respective engine of the one or more engines, a high speed clutch integrated into a high speed gear train, and a low speed clutch integrated into a low speed gear train. The high speed clutch and the low speed clutch are freewheeling clutches without a friction plate and are capable of disconnecting the output shaft and the input shaft in an overrunning condition when the output shaft spins faster than the input shaft.

22 Claims, 6 Drawing Sheets

MULTI-RATIO ROTORCRAFT DRIVE SYSTEM AND A METHOD OF CHANGING GEAR RATIOS THEREOF

CROSS-REFERENCE TO RELATED APPLICATIONS

This application claims the benefit of U.S. patent application Ser. No. 12/502,596 filed Jul. 14, 2009, which application is incorporated herein by reference.

FIELD

The present disclosure relates to the field of rotorcraft systems, and more particularly to a multi-ratio rotorcraft drive system and a method of changing gear ratios thereof.

BACKGROUND

Powered lift rotorcrafts such as helicopters and tiltrotors use lifting forces generated by wings or rotor blades that revolve around a mast. In a conventional rotorcraft, rotor blades are powered by one or more engines by way of a transmission, and the speed of the transmission input is reduced using one or more fixed ratio reduction stages such that the speed of the output powering the rotor is lower than the input speed by a fixed ratio. Optimization of rotorcraft performance, including noise, range, and efficiency, can be accomplished by varying rotor speed.

A typical method of reducing rotor speed in a rotorcraft is to reduce the input speed of a transmission provided by an engine, which directly reduces the rotor speed by a proportional amount. A general problem in performing this technique is that reducing the operating speed of the engine may result in a loss in engine efficiency or performance, degrading the net performance improvements possible by reducing the rotor RPM. This is mainly because the speed range of the engine that produces optimal power is more narrow and limited than that of the rotor system. In order to overcome these shortcomings, multi-ratio transmissions can be used to provide appropriate torque and speed to the rotor shaft by engaging gears of different ratios.

Friction clutches disengage the torque transfer path within a transmission and enable the engagement of an alternate gear system with a different reduction ratio. In such cases, torque is transmitted from the engine to the output shaft via frictional coupling between clutch plates.

While common for automobiles, the disadvantages of relying on friction to provide torque throughout speed transitions are; a lack of overrunning capability, increased debris generation, heat generation during engagement, installed weight (also referred to as power density), increased potential for drive train shock loads during engagement and disengagement, and potential for inadvertent disengagement while under load. Specifically, the need for additional components for overrunning capability necessary for aircraft autorotation makes the overall transmission assembly more complex and heavier.

From the foregoing, there is a need for a light-weight transmission shifting method and mechanism overcoming the above-described shortcomings of current fixed ratio and friction clutch based multi-ratio rotorcraft transmissions.

SUMMARY

A multi-ratio rotorcraft drive system and a method of changing gear ratios thereof are disclosed. According to one embodiment, the multi-ratio rotorcraft drive system comprises a rotor system comprising one or more rotors and one or more engines. Each engine of the one or more engines is coupled to the rotor system through a multi-ratio transmission. The multi-ratio transmission comprises an output shaft coupled to the rotor system, an input shaft coupled to a respective engine of the one or more engines, a high speed clutch integrated into a high speed gear train, and a low speed clutch integrated into a low speed gear train. The high speed clutch and the low speed clutch are freewheeling clutches without a friction plate and are capable of disconnecting the output shaft and the input shaft in an overrunning condition when the output shaft spins faster than the input shaft. The multi-ratio transmission shifts between the high speed gear train and the low speed gear train by engaging or disengaging the high speed clutch and modulating speed of the coupled engine.

In one embodiment, the speed of a rotor system is reduced from a high speed to a low speed. The speed of the rotor system is lowered from the high speed to a transitional speed. A first multi-ratio transmission coupled to a first engine is shifted from a high gear to a low gear while the speed of the rotor system is maintained at or near the transitional speed. A second multi-ratio transmission coupled to a second engine is shifted from a high gear to a low gear while the speed of the rotor system is maintained at or near the transitional speed. The speed of the first engine and second engine is restored to an optimum engine speed, causing the speed of the rotor system to be reduced to the low speed.

In another embodiment, the speed of the rotor system is increased from a low speed to a high speed. First, the speed of the rotor system is increased from the low speed to a transitional speed. The first multi-ratio transmission coupled to the first engine is shifted from a low gear to a high gear while the speed of the rotor system is maintained at or near the transitional speed. The second multi-ratio transmission coupled to the second engine is shifted from a low gear to a high gear while the speed of the rotor system is maintained at or near the transitional speed. The speed of the first engine and second engine is restored to an optimum engine speed, causing the speed of the rotor system to be increased to the high speed.

In accordance with the purpose of the various embodiments described herein, as broadly described herein, the subject matter of this patent relates to powered lift rotorcraft systems with a multi-ratio transmission.

The above and other preferred features, including various novel details of implementation and combination of elements will now be more particularly described with reference to the accompanying drawings and pointed out in the claims. It will be understood that the particular methods and apparatus are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

Figure 1:
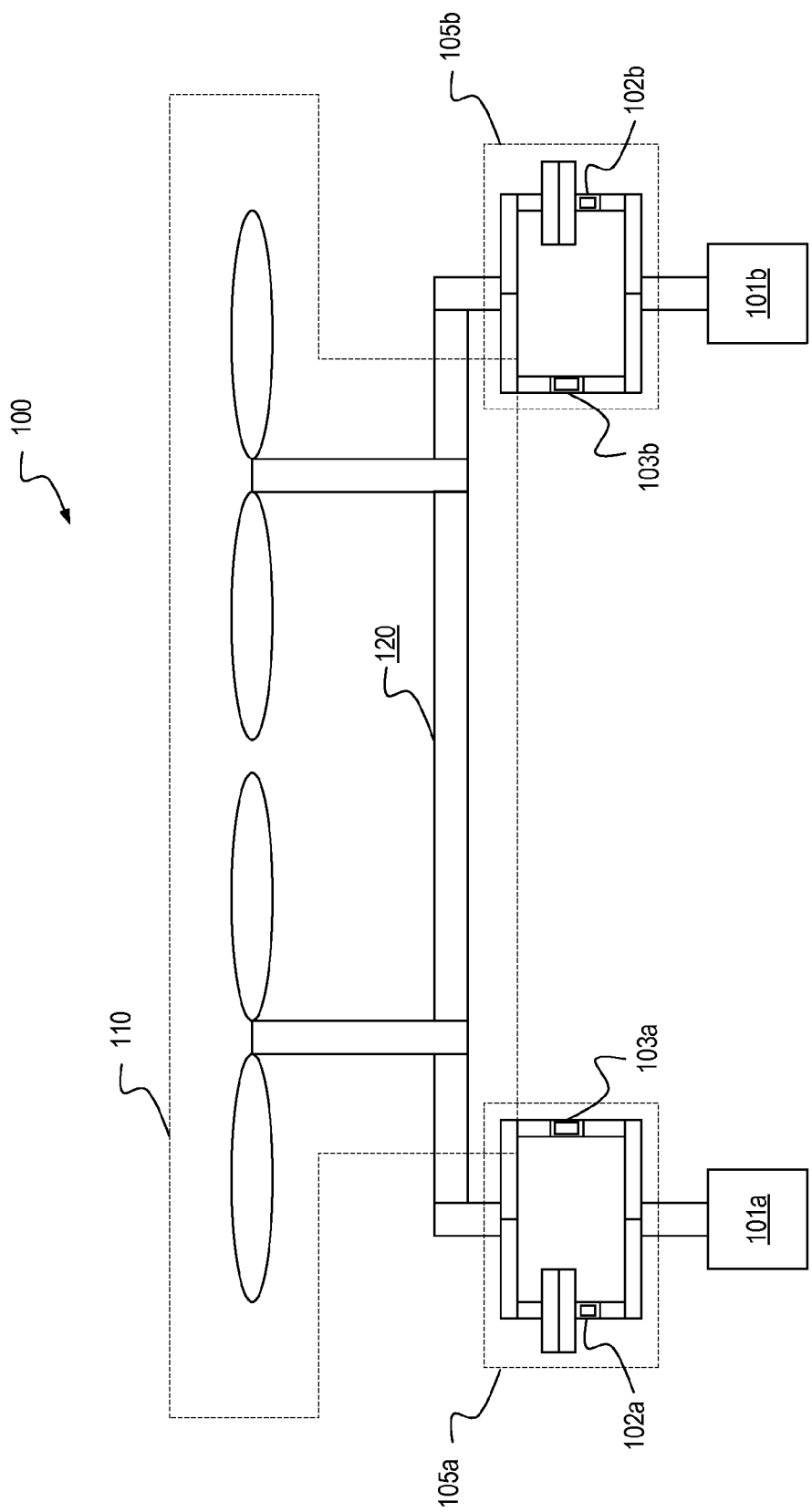
FIG. 1 illustrates an exemplary high speed operation of a multi-rotor, multi-engine rotorcraft system with multi-ratio transmissions, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A multi-ratio rotorcraft drive system and a method of changing gear ratios thereof are disclosed. According to one embodiment, the multi-ratio rotorcraft drive system comprises a rotor system comprising one or more rotors and one or more engines. Each engine of the one or more engines is coupled to the rotor system through a multi-ratio transmission. The multi-ratio transmission comprises an output shaft coupled to the rotor system, an input shaft coupled to a respective engine of the one or more engines, a high speed clutch integrated into a high speed gear train, and a low speed clutch integrated into a low speed gear train. The high speed clutch and the low speed clutch are freewheeling clutches without a friction plate and are capable of disconnecting the output shaft and the input shaft in an overrunning condition when the output shaft spins faster than the input shaft. The multi-ratio transmission shifts between the high speed gear train and the low speed gear train by engaging or disengaging the high speed clutch and modulating speed of the coupled engine.

In one embodiment, the speed of a rotor system is reduced from a high speed to a low speed. The speed of the rotor system is lowered from the high speed to a transitional speed. A first multi-ratio transmission coupled to a first engine is shifted from a high gear to a low gear while the speed of the rotor system is maintained at or near the transitional speed. A second multi-ratio transmission coupled to a second engine is shifted from a high gear to a low gear while the speed of the rotor system is maintained at or near the transitional speed. The speed of the first engine and second engine is restored to an optimum engine speed, causing the speed of the rotor system to be reduced to the low speed.

In another embodiment, the speed of the rotor system is increased from a low speed to a high speed. First, the speed of the rotor system is increased from the low speed to a transitional speed. The first multi-ratio transmission coupled to the first engine is shifted from a low gear to a high gear while the speed of the rotor system is maintained at or near the transitional speed. The second multi-ratio transmission coupled to the second engine is shifted from a low gear to a high gear while the speed of the rotor system is maintained at or near the transitional speed. The speed of the first engine and second engine is restored to an optimum engine speed, causing the speed of the rotor system to be increased to the high speed.

Each of the additional features and teachings disclosed herein can be utilized separately or in conjunction with other features and teachings to provide an improved design for a multi-ratio rotorcraft drive system. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present system and method enables the operation of a rotor system at multiple speeds for a single engine speed using a multi-ratio drive system. The engine speed is maintained in its most efficient range while varying the rotor speed for optimum aircraft performance. The present system and method provides a weight-efficient and power-efficient configuration without using friction clutches. In cases that an aircraft has two engines, the present system and method allows the aircraft to have power from at least one engine during normal shifting to facilitate the change in rotor speed. Transmission ratios can be changed in flight while providing power from at least one engine to the rotor system at all times.

FIG. 1 illustrates an exemplary high speed operation of a rotorcraft system with multi-ratio transmissions, according to one embodiment. Rotorcraft system 100 has two engines 101a and 101b and respective transmissions 105a and 105b, which drive rotor system 110. Rotor system 110 has two rotors connected together via interconnect driveshaft system 120. In an alternative embodiment, rotor system 110 may be coupled to transmissions 105a and 105b through gears.

According to one embodiment, high speed clutch 102 and low speed clutch 103 are sprag clutches. Sprag clutches are 'one-way' freewheeling clutches designed to transmit torque unidirectionally from the input (e.g., engine 101) to the output (e.g., rotor system 110). Due to their 'one-way' design, sprag clutches transmit insignificant or no torque during an overrunning condition when the output shaft is spinning faster than the input shaft. Sprag clutches prevent a rotor from driving an engine should the engine lose power. Gear shifting of high speed clutch 102 is achieved by modulating the speed of engine 101 and engaging or disengaging high speed clutches 102.

According to one embodiment, high speed clutches 102 and low speed clutches 103 are self-energizing clutches that do not have friction plates. A self-energizing clutch allows more efficient torque transfer as the input and output shafts mate tighter. When the speed of the input and output shafts are dissimilar in speed, the self-energizing clutch allows no torque transfer. With its internal driving mechanism, the self-energizing clutch automatically energizes and efficiently transmits torque when an overrunning condition is removed.

Conventional self-energizing clutches do not have the capability to control and modulate the speed of the output shaft with respect to the speed of the input shaft without a proper clutch mechanism. For this reason, a friction clutch may be used in series with a self-energizing freewheeling clutch to provide such capability. However, friction clutches require large friction surfaces to transmit torque from the input shaft to the output shaft, which adds more weight to the mechanism and increases maintenance requirements due to the wear and tear of engaging components. The present system and method eliminates the use of friction clutches and achieves significant advantages on efficiency, size, and weight over prior art rotorcraft drive clutch designs.

During high speed operation, both high speed clutch 102 and low speed clutch 103 are engaged. However, torque is transmitted only through high speed clutch 102 from engine 101 to rotor 110 because low speed clutch 103 is a one-way clutch in an overrunning condition where its output spins faster than its input.

According to one embodiment, engine 101 runs at a cruising speed that is slower than the maximum speed where maximum operational efficiency of engine 101 is achieved. For example, during cruise speed operation, engines 101 and rotors 110 run at 84% of their maximum speeds. The percentage of optimal speeds is selected for illustrative purposes only, and it is appreciated that any percentage may be used without deviating from the scope of the present subject matter.

Figure 2:
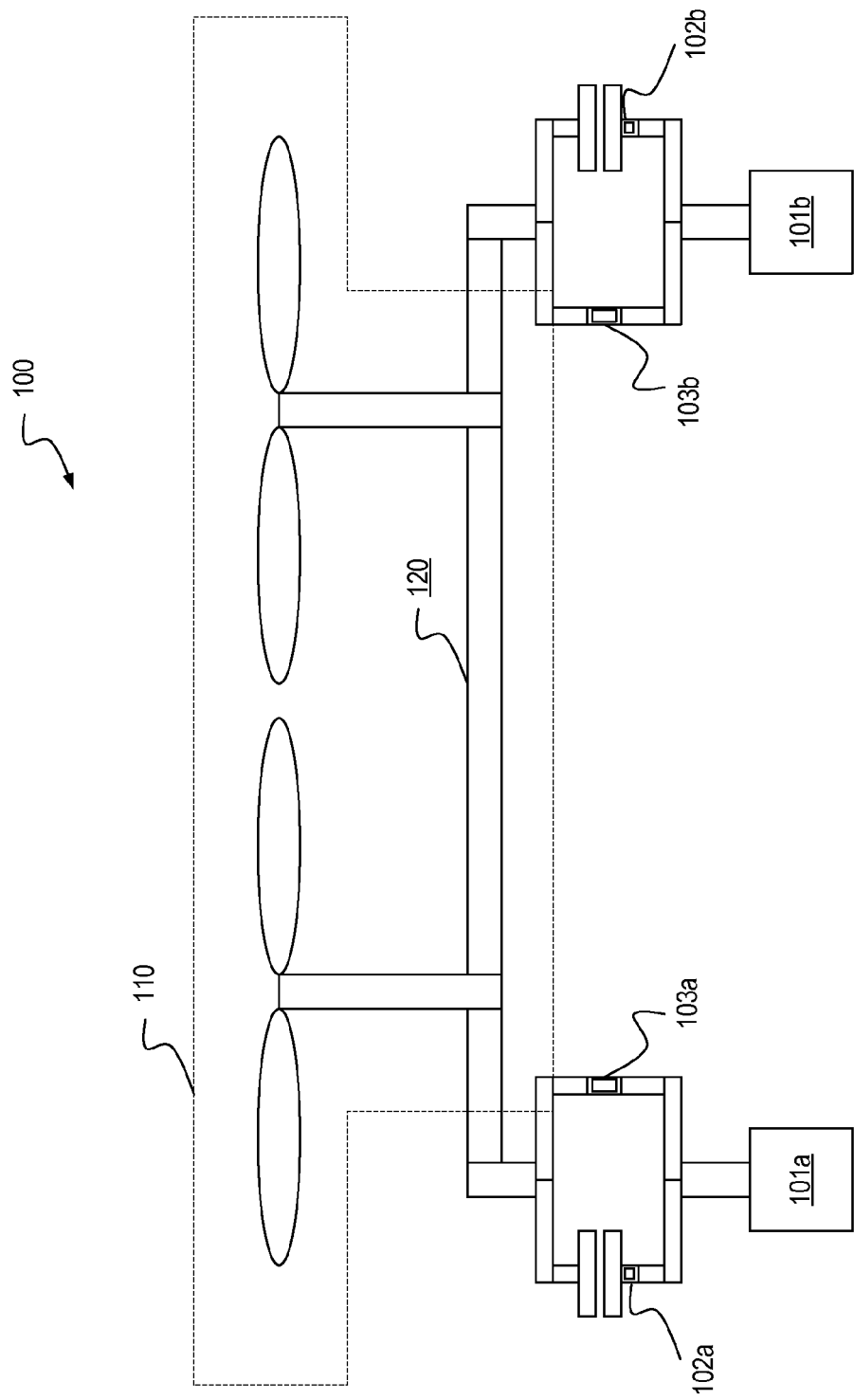
FIG. 2 illustrates an exemplary low speed operation of a multi-rotor, multi-engine rotorcraft system with multi-ratio transmissions, according to one embodiment.

FIG. 2 illustrates an exemplary low speed operation of a rotorcraft system with multi-ratio transmissions, according to one embodiment. For low rotor speed operation, high speed clutch 102 is disengaged, and low speed clutch 103 transmits torque from engine 101 to rotor 110. According to one embodiment, low speed clutch 103 is permanently engaged for both high and low speed operation so that gear shifting from the high gear ratio to the low gear ratio occurs by simply disengaging high speed clutch 102. Conversely, shifting from the low gear ratio to high gear ratio occurs by re-engaging high speed clutch 102. After shifting occurs from the high gear to the low gear, engines 101 still run at their optimal speed (e.g., 84% of their maximum speeds) while rotors 110 spin at a low speed (e.g., 60% of its maximum speed). The transition of rotor speed (e.g., 84% to 60%) occurs in several steps, which are described below in greater detail.

For the purpose of illustration, the maximum engine speed and maximum rotor speed are symbolized as E and R. In high gear, the maximum engine speed E generates maximum rotor speed R. The rotor speed is calculated by the following equation:

$$\omega_{rotor} = r \cdot \omega_{engine}.$$

where r is the gear ratio. In high gear, $r_{high}$=R/E, and $r_{low}$=f$\cdot r_{high}$, in low gear, where f is a gear reduction factor. In view of the present example, the optimum engine speed is 0.84E (84% of the maximum engine speed) that corresponds to the rotor speed 0.84R (84% of maximum rotor speed) when engaged in the high speed gear.

Figure 3:
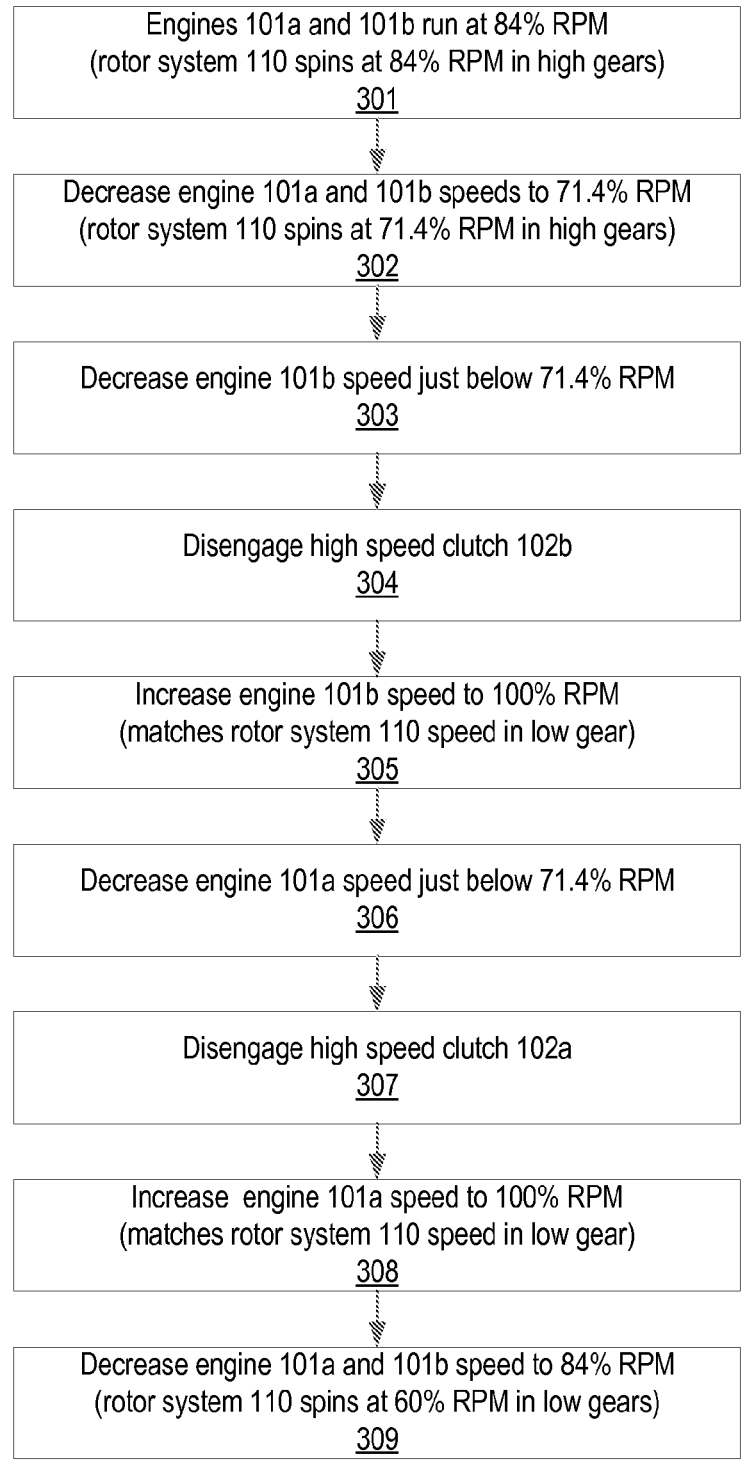
FIG. 3 illustrates an exemplary block diagram for high speed to low speed transition, according to one embodiment.

FIG. 3 illustrates an exemplary block diagram for high speed to low speed transition, according to one embodiment. In the present example, the gear reduction factor, f=0.714 is used, however it is appreciated that any other gear reduction factor might be used without deviating from the scope of the present subject matter. The engine speeds of both engines 101a and 101b are lowered from cruising speed (0.84R) to a slower speed, for example, 0.714R in the high speed gear such that rotor system 110 spins at 0.714R. When the engine speed of engine 101b is reduced to just below 0.714R, high speed clutch 102b is in an overrunning condition and is easily disengaged. Transmission 105b is now in the low gear. The torque path is switched from high speed clutch 102b to low speed clutch 103b, although torque is not present or insignificant when output shaft speed of clutch 103b is greater than its input shaft speed. After the gear shift, the engine speed of engine 101b is increased to 1.0E to match the speed of the rotor system 110 at 0.714R ($r_{high}$*0.714E).

With engine 101b running at full speed (1.0E) and rotor system 110 running at 0.714R, similar shifting is performed on engine 101a and transmission 105a to change the torque path from high speed clutch 102a to low speed clutch 103a. After reducing the engine speed of engine 101a just below 0.714R, high speed clutch 102a is disengaged, and transmission 105a is in the low gear. After the gearshift, the engine speed of engine 101a is ramped up to 1.0E so that both engines 101a and 101b are driving rotor system 110 at a speed of 0.714R. After the gear shifting on both engines 101a and 101b has occurred, low speed clutches 103a and 103b solely transmit torque to rotor system 110. The speeds of both engines 101a and 101b are lowered to their cruising speed at 0.84E such that the speed of the rotor system is lowered to the low speed, 0.60R ($r_{low}$*0.84E).

According to one embodiment, transmissions 105b and 105a switch gears sequentially such that there is at least one engine powering rotor system 110 at all times. As shown in the previous example of high speed to low speed transition, gear switching may occur in sequence, but some intermediate steps for changing the ratio between engines 101a and 101b and rotor system 110 might vary. For example, the engine speed of engine 101a may remain at 1.0E while transmission 105b shifts, or rotor system 110 may be freewheeling while gear shifting occurs. It is appreciated that the steps of speed adjustment and gear shifting may occur in different orders without deviating from the scope of the present subject matter.

According to one embodiment, a single transmission, engine, and rotor system can change ratios by controlling the rotor speed using the rotor controls as opposed to another engine and interconnect system. This method permits the rotor system speed to maintain speed near the transitional speed while the engine reduces speed and the clutch overruns and disengages allowing a shift from high speed to low speed. Alternatively, to shift from a low speed to a high speed, the rotor system may be controlled to increase rotor speed taking advantage of the rotorcraft altitude and speed, and enable the transmission to shift from the low speed to the high speed in the same manner as described for the high speed to low speed transition.

Figure 4:
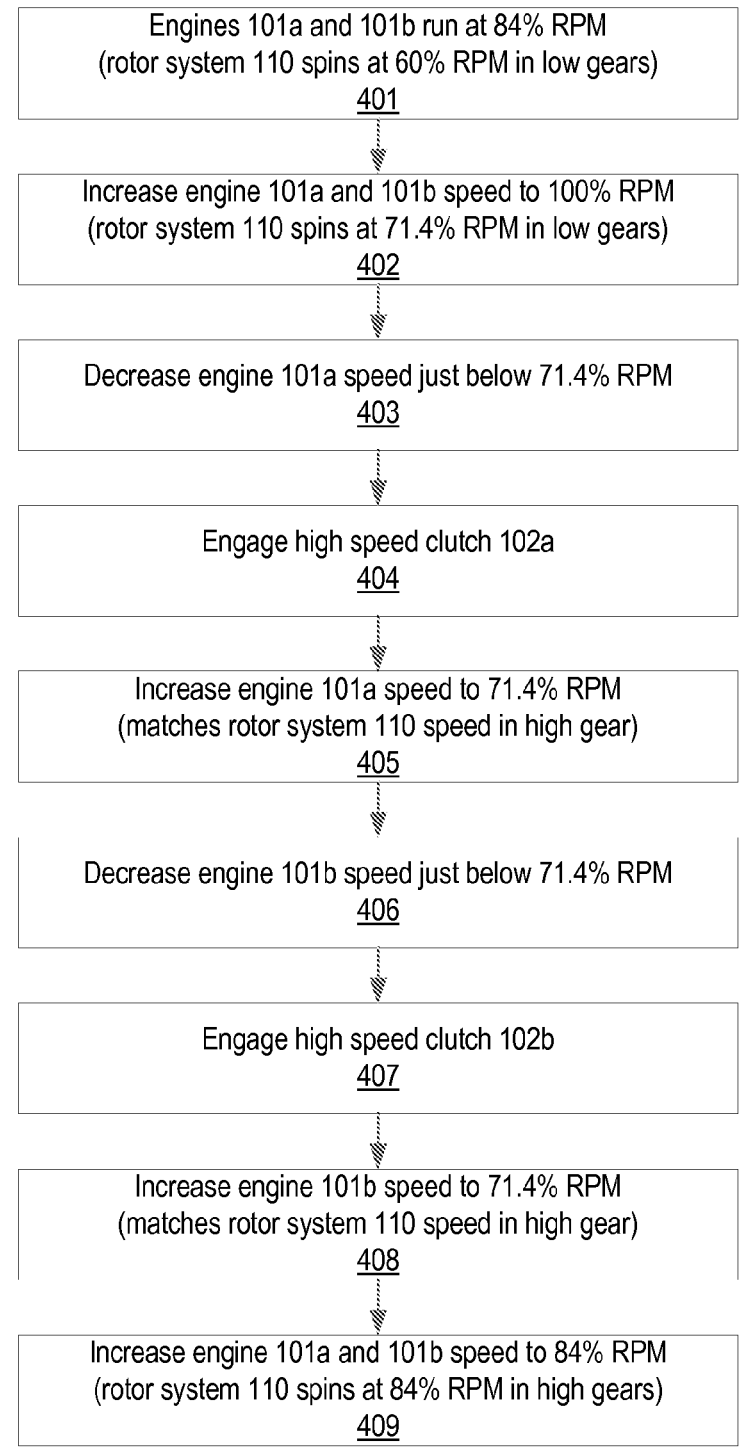
FIG. 4 illustrates an exemplary block diagram for low speed to high speed transition, according to one embodiment.

FIG. 4 illustrates an exemplary block diagram for low speed to high speed transition, according to one embodiment. The same gear reduction ratio, f=0.714 is used in the present example to illustrate the speed transition from low speed to high speed. Engine 101 runs at cruising speed (0.84E), and rotor system 110 spins at a low speed, 0.60R ($r_{low}$*0.84E) in its low gear. The speed of engines 101a and 101b is increased from the cruising speed (0.84E) to the maximum speed (1.0E) to ramp up the rotor speed to the shifting speed, for example, 0.714R. The engine speed of engine 101a is reduced to just below 0.714E, causing high speed clutch 102a to be in an overrunning condition. High speed clutch 102a is engaged in the overrunning condition, which changes the torque path from low speed clutch 103a to high speed clutch 102a when the speed of the output shaft matches the speed of the input shaft. The engine speed of engine 101a is changed to 0.714E such that torque is applied to rotor system 110 from engine 101a.

With engine 101a running at 0.714E, transmission 105a in high gear, and rotor system 110 running at 0.714R, gear shifting is performed on transmission 105b and engine 101b. The engine speed of engine 101b is reduced to just below the transition speed (0.714E), and high speed clutch 102b is engaged. After the gear shifting, engine 101b runs up to 0.714E, and matches the rotor system at 0.714R. After the shifting is completed for both transmissions 105a and 105b, the speed of both engines 101a and 101b is increased to their cruising speed at 0.84E such that speed of rotor system 110 is increased to the cruising speed, 0.84R.

Figure 5:
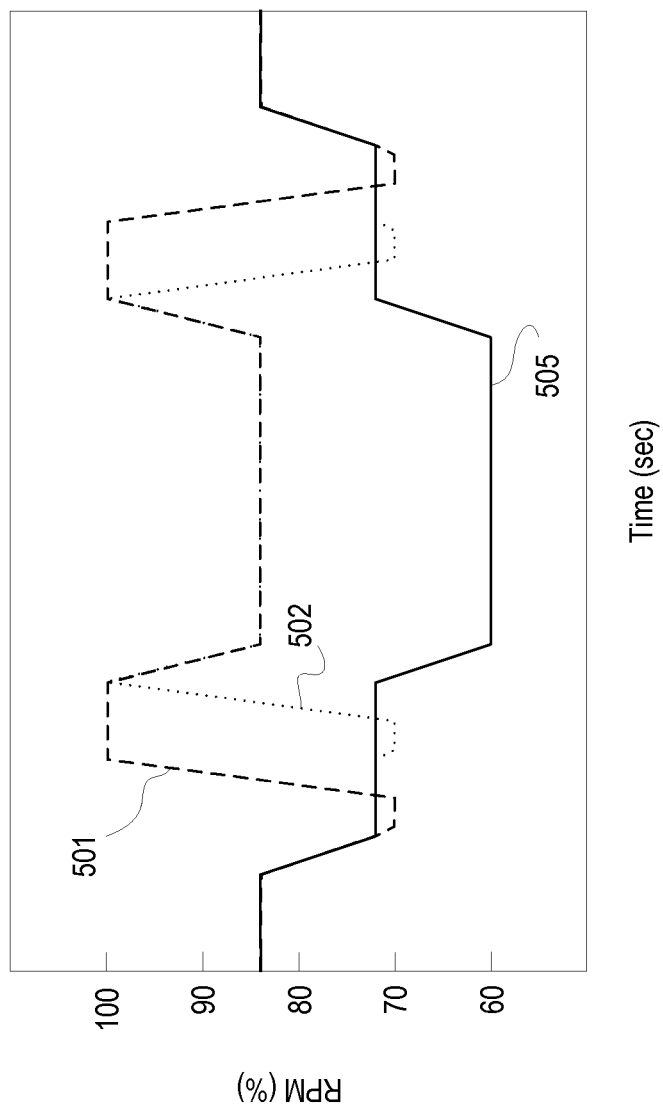
FIG. 5 illustrates an exemplary engine and rotor speed profile during shift to low speed and back to high speed, according to one embodiment.

FIG. 5 illustrates an exemplary engine and rotor speed profile during shift to low speed and back to high speed, according to one embodiment. Rotor speed 505 is reduced from a cruising speed, for example, 0.84R to a slow speed, for example, 0.60R, and ramped up back to the cruising speed, 0.84R. During the speed transition of rotor system 110, the engine speeds 501 and 502 of engine 101a and 101b are illustrated as shown in FIG. 5. Transmission 105a shifts gears from its high gear to low gear while engine 101a runs just below the speed of the rotors. As soon as the gear shifting at transmission 105a is completed, transmission 105b shifts gears from its high gear to low gear in a similar manner as transmission 105a did. Gear shifting from low speed to high speed gears occurs in opposite orders as illustrated in the second half of the plot in FIG. 5.

Figure 6:
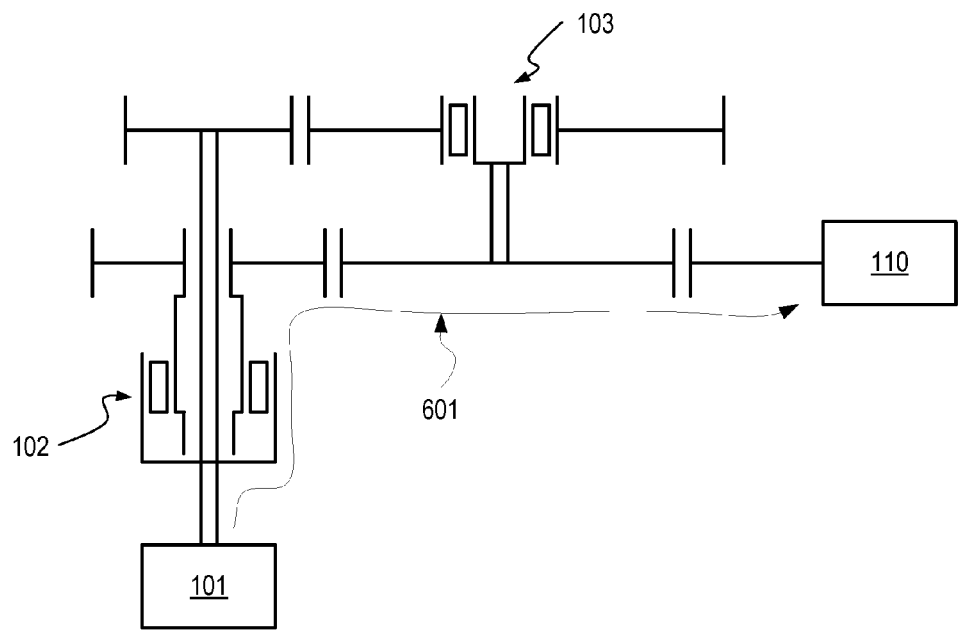
FIG. 6 illustrates an exemplary high speed configuration of multi-ratio rotorcraft drive system, according to one embodiment.

FIG. 6 illustrates an exemplary high speed configuration of multi-ratio rotorcraft drive system, according to one embodiment. In high speed configuration, torque from engine 101 is transmitted via torque path 601 through high speed clutch 102 to rotor 110. Low speed clutch 103 is always engaged such that when high speed clutch 102 disengages, the torque path from engine 101 to rotor 101 is transmitted through low speed clutch 103.

Figure 7:
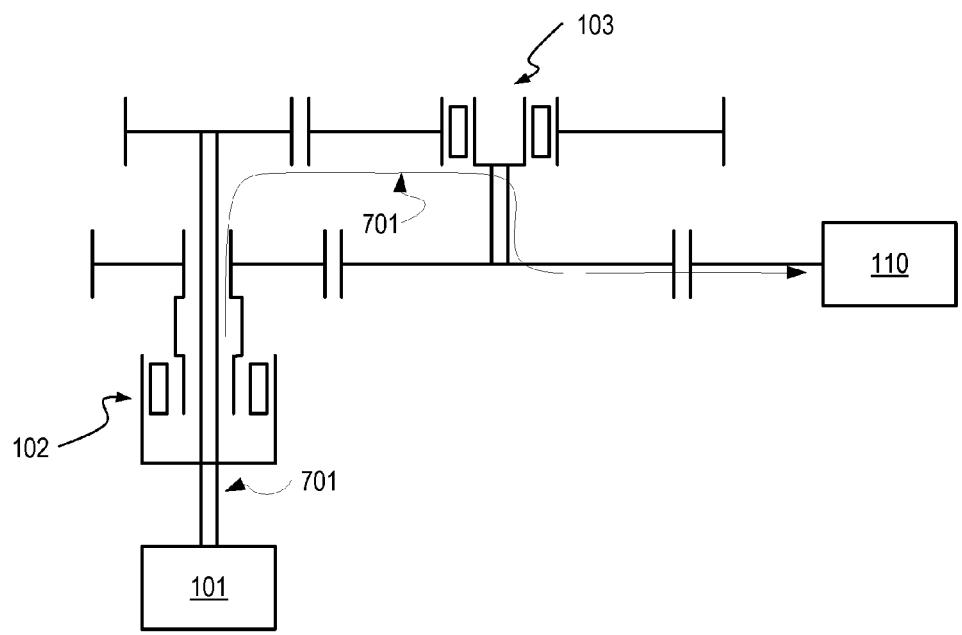
FIG. 7 illustrates an exemplary low speed configuration of multi-ratio rotorcraft drive system, according to one embodiment.

FIG. 7 illustrates an exemplary low speed configuration of multi-ratio rotorcraft drive system, according to one embodiment. In low speed configuration, high speed clutch 102 is disengaged such that torque is transmitted via torque path 701 through the output shaft of engine 101 and low speed clutch 103 to rotor 110.

According to one embodiment, high speed clutch 102 and low speed clutch 103 are overrunning clutches. When the output shaft is spinning faster than the input shaft of overrunning clutches, there is no torque transmission. On the other hand, when the output shaft is not spinning faster than the input shaft of overrunning clutches, the input and output shafts are instantaneously coupled, and torque is transmitted as if the input and output shafts are coupled without differential rotation. This safety feature of overrunning clutches is especially useful in the event of engine failure so that rotors can freely rotate by automatically disconnecting the engine.

According to one embodiment, the engine speed of engines 101 is maintained in their most efficient range except during the speed transition while varying the rotor speed for optimum performance. Although the two-ratio version is shown in the previous examples, a different number of clutch systems may be used in a drive system with more than two gear ratios. The number of speeds may be determined by aircraft weight and performance requirements.

A multi-ratio rotorcraft drive system and a method of changing gear ratios thereof have been described with respect to specific example and subsystems. It will be apparent to those of ordinary skill in the art that it is not limited to these specific examples or subsystems but extends to other embodiments as well.

We claim:

1. A method of reducing the speed of a driven system driven by a plurality of power units from a high speed to a low speed, the method comprising:
   lowering the speed of the driven system from the high speed to a transitional speed;
   shifting a first multi-ratio transmission coupled to a first power unit of the plurality of power units from a high speed gear train integrating a high speed clutch to a low speed gear train integrating a low speed clutch while the speed of the driven system is maintained at or near the transitional speed;
   shifting a second multi-ratio transmission coupled to a second power unit of the plurality of power units from a high speed gear train integrating a high speed clutch to a low speed gear train integrating a low speed clutch while the speed of the driven system is maintained at or near the transitional speed; and
   restoring the speed of the plurality of power units to an optimum power unit speed, causing the speed of the driven system to be reduced to the low speed.

2. The method of claim 1, wherein the lowering the speed of the driven system from the high speed to a transitional speed further comprising:
   lowering the speed of the first power unit below the transitional speed of the driven system;
   disengaging the high speed clutch of the first multi-ratio transmission; and
   ramping the speed of the first power unit to match the transitional speed of the driven system.

3. The method of claim 1, wherein the lowering the speed of the driven system from the high speed to a transitional speed further comprising:
   lowering the speed of the second power unit below the transitional speed of the driven system;
   disengaging the high speed clutch of the second multi-ratio transmission; and
   ramping the speed of the second power unit to the transitional speed of the driven system.

4. The method of claim 1, wherein each low speed clutch of the first multi-ratio transmission and the low speed clutch of second multi-ratio transmission is permanently engaged.

5. The method of claim 1, wherein each high speed clutch of the first multi-ratio transmission and the high speed clutch of second multi-ratio transmission is selectively disengaged and engaged for respective lowering and increasing the speed of the driven system.

6. The method of claim 1, wherein each high speed clutch and each low speed clutch of the first multi-ratio transmission and second multi-ratio transmission is self-energizing freewheeling clutches with an overrunning capability.

7. A method of increasing the speed of a driven system driven by a plurality of power units from a low speed to a high speed, the method comprising:
   increasing the speed of the driven system from the low speed to a transitional speed;

shifting a first multi-ratio transmission coupled to a first power unit of the a plurality of power units from a low speed gear train integrating a low speed clutch to a high speed gear train integrating a high speed clutch while the speed of the driven system is maintained at or near the transitional speed;

shifting a second multi-ratio transmission coupled to a second power unit of the a plurality of power units from a low speed gear train integrating a low speed clutch to a high speed gear train integrating a high speed clutch while the speed of the driven system is maintained at or near the transitional speed; and restoring the speed of the a plurality of power units to an optimum power unit speed, causing the speed of the driven system to be increased to the high speed.

8. The method of claim 7, wherein the increasing the speed of the driven system from the low speed to a transitional speed further comprising:

lowering the speed of the first power unit below the transitional speed of the driven system;

engaging the high speed clutch of the first multi-ratio transmission; and ramping the speed of the first power unit to match the transitional speed of the driven system.

9. The method of claim 7, wherein the increasing the speed of the driven system from the low speed to a transitional speed further comprising:

lowering the speed of the second power unit below the transitional speed of the driven system;

engaging the high speed clutch of the second multi-ratio transmission; and ramping the speed of the second power unit to the transitional speed of the driven system.

10. The method of claim 7, wherein each low speed clutch of the first multi-ratio transmission and the low speed clutch of second multi-ratio transmission is permanently engaged.

11. The method of claim 7, wherein each high speed clutch of the first multi-ratio transmission and the high speed clutch of second multi-ratio transmission is selectively disengaged and engaged for respective lowering and increasing the speed of the driven system.

12. The method of claim 7, wherein each high speed clutch and each low speed clutch of the first multi-ratio transmission and second multi-ratio transmission is self-energizing freewheeling clutches with an overrunning capability.

13. A method of reducing the speed of a driven system driven by a power unit from a higher speed to a lower speed, the method comprising:

lowering the speed of the driven system from a first speed to a transitional speed;

shifting a multi-ratio transmission coupled to a power unit from a higher speed gear train integrating a clutch to a lower speed gear train integrating a clutch while the speed of the driven system is maintained at or near the transitional speed; and restoring the speed of the power unit to an optimum power unit speed, causing the speed of the driven system to be reduced to a second speed that is slower than the first speed.

14. The method of claim 13, wherein the lowering the speed of the driven system from the first speed to the transitional speed further comprising:

lowering the speed of the power unit below the transitional speed of the driven system;

disengaging the clutch of the higher speed gear train; and ramping the speed of the power unit to match the transitional speed of the driven system.

15. The method of claim 13, wherein the clutch of the lower speed gear train remains engaged.

16. The method of claim 13, wherein the clutch of the higher speed gear chain is selectively disengaged and engaged for respective lowering and increasing the speed of the driven system.

17. The method of claim 13, wherein the clutches of the higher and lower speed gear trains are self-energizing freewheeling clutches with an overrunning capability.

18. A method of increasing the speed of a driven system driven by a power unit from a lower speed to a higher speed, the method comprising:

increasing the speed of the driven system from a first speed to a transitional speed;

shifting a multi-ratio transmission coupled to the power unit from a lower speed gear train integrating a clutch to a higher speed gear train integrating a clutch while the speed of the driven system is maintained at or near the transitional speed;

restoring the speed of the power unit to an optimum power unit speed, causing the speed of the driven system to be increased to a second speed that is higher than the first speed.

19. The method of claim 18, wherein the increasing the speed of the driven system from the first speed to a transitional speed further comprising:

lowering the speed of the power unit below the transitional speed of the driven system;

engaging the clutch of the higher speed gear train; and ramping the speed of the power unit to match the transitional speed of the driven system.

20. The method of claim 18, wherein the clutch of the lower speed gear train remains engaged.

21. The method of claim 18, wherein the clutch of the high speed gear train is selectively disengaged and engaged for respective lowering and increasing the speed of the driven system.

22. The method of claim 18, wherein the clutches of the lower and higher speed gear trains are self-energizing freewheeling clutches with an overrunning capability.

* * * * *